March 9, 1965   J. DE LAREBEYRETTE   3,172,766
PROCESS FOR THE PREPARATION OF CEREAL FLOURS
Filed Feb. 28, 1961   3 Sheets-Sheet 3
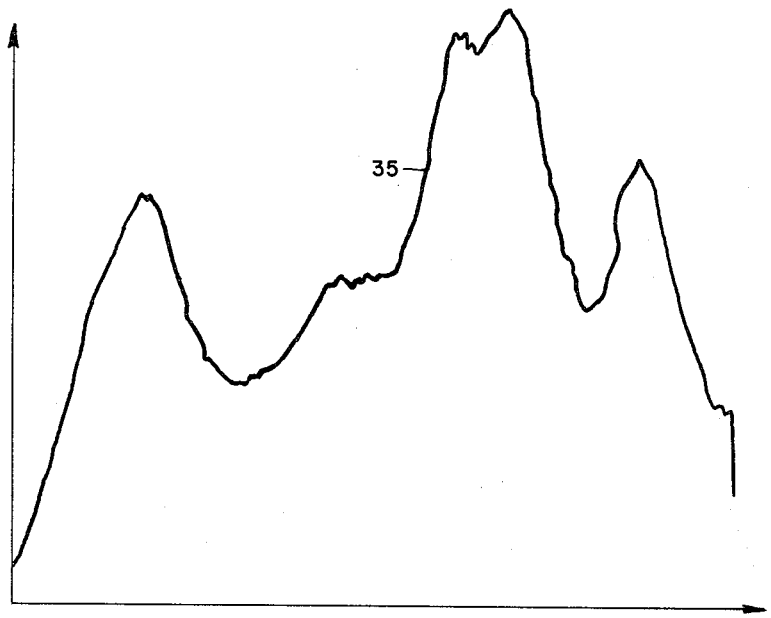
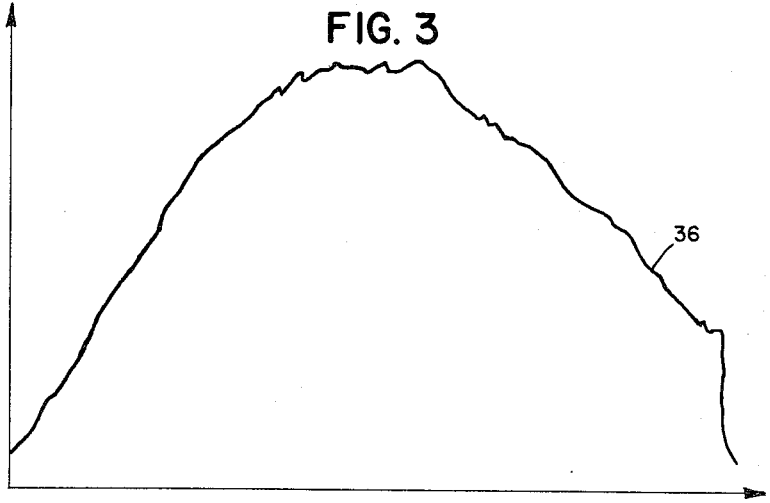

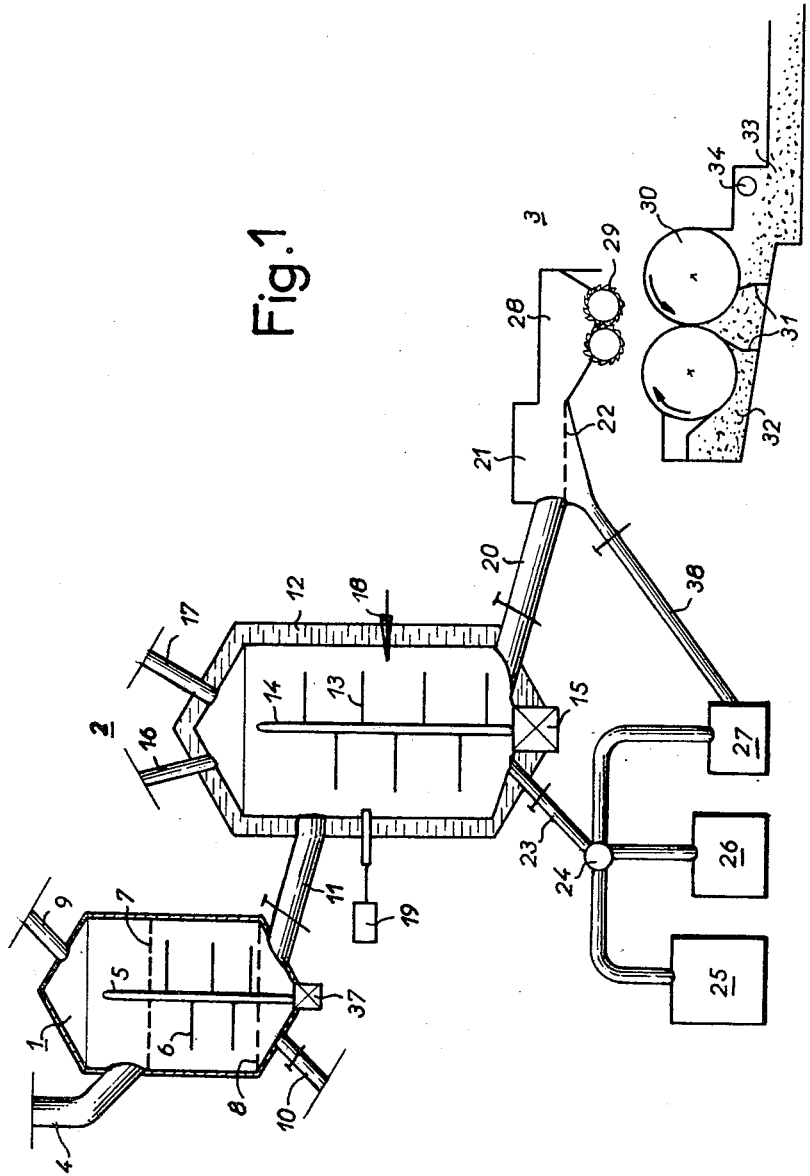

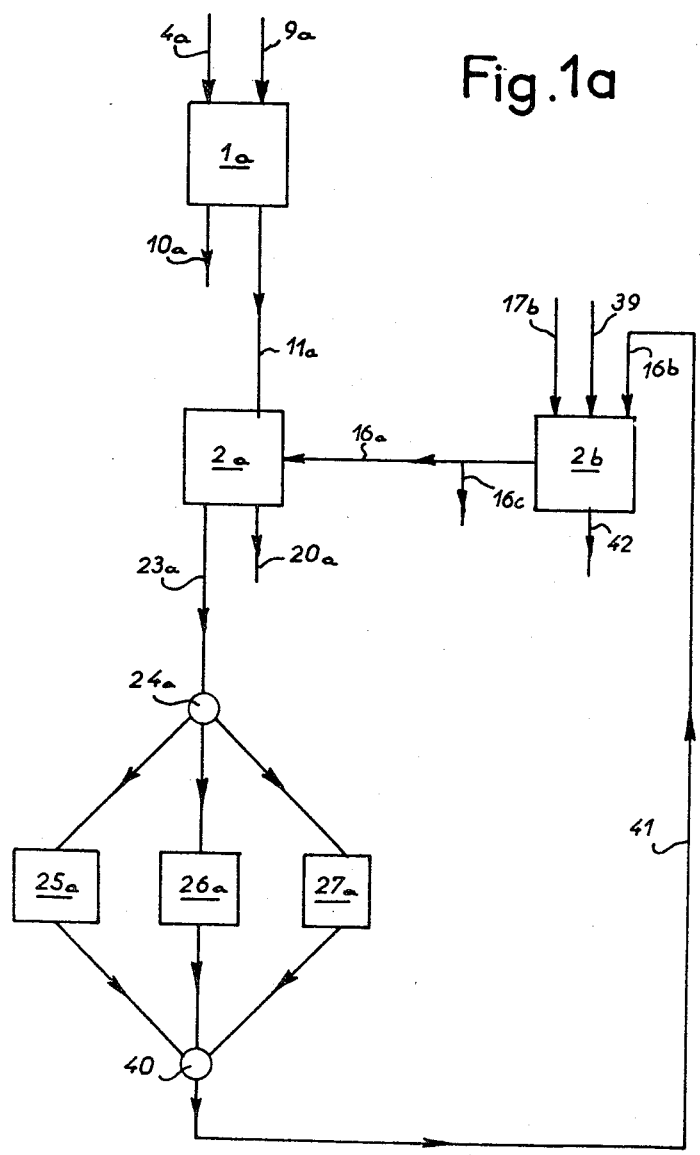

3,172,766
PROCESS FOR THE PREPARATION OF CEREAL FLOURS
Jean de Larebeyrette, Sens, France, assignor to
Jean-Philippe Lepetre, Paris, France
Filed Feb. 28, 1961, Ser. No. 92,414
Claims priority, application France, Mar. 1, 1960,
819,996
5 Claims. (Cl. 99—93)

The present invention relates generally to improvements in the milling of cereal grains and, more particularly, to a process for producing improved cereal flours, to apparatus for carrying out such process and to the improved flours thus obtained.

It is known among specialists that ordinary cereal flours obtained by conventional processes (for which the bolting content is very high to give satisfactory storage) have at the present time a number of serious disadvantages for consumers, due to defects in their physical and chemical nature.

In particular, all flours of all cereals (whatever their method of preparation or of cooking) retain the 1–6 polysaccharide link, which is unaffected in man by digestive juices and the intestinal flora; furthermore, the rapid action of industrial yeasts, at temperatures which are often badly regulated in bakeries, does not provide a sufficient action time, nor the pH, nor the complexity of the processes necessary to the pre-digestion of flours.

Standard highly-bolted flours have too high an alkalnity to allow correct action of digestive enzymes and interaction between vitamins. The digestive quality of a flour depends particularly on the equilibrium between the three physical factors of pH, resistivity and oxydoreductive power; in standard flours these two latter characteristics are quite clearly too small.

Depending upon its effectiveness, sifting removes a proportion of from 30% to 80% of the enzymes and vitamins. If the cereal germ is not removed, lipides and phospholipides remain as a result and these rapidly cause rancidity in the flour obtained; on the other hand (standard flours), the absence of these very substances destroys a series of indispensable links in the chain of digestion.

Finally, in standard flours, gluten and proteins are present in insufficient and poorly assimilable proportions, as a result of increased bolting and for want of this proto-digestion, which is one of the objects of the present invention.

Products obtained from ordinary flours, such as biscuits and, particularly, white bread, do not contain either the quantity nor the desired variety of enzymes and vitamins in the proportions strictly indispensable to their correct assimilation by living organisms (men and animals). This results in the extreme frequency of digestive, cardiac and nervous disorders which may lead to very serious vascular, cardiac and cerebral accidents.

The last Biological Congresses confirmed that a large proportion of metabolic illnesses are accompanied by the absence or insufficiency of an enzyme or specific group of enzymes participating in the normal metabolism of nutritional substances. Present day bread was taken by the biologists as a typical example of a food deficient in vitamin-enzymes.

In man, for example, the consumption of standard flours leads to the appearance of important dyspeptic disorders (see reports of Gounelle and Gofman; the summary of Biological Chemistry by J. E. Courtois, 1959, where bread and white flour are quoted as examples of foods deficient in enzymes and vitamins) and initiates the great majority of vascular illnesses, with ischemic vascular disorders, acute oedema and infarction.

The troubles brought about by conventional flours are biologically identifiable and controllable (sanguinary hyper-viscosity; considerable increase in the alpha 2 euglobins and neutral and acid polysaccharides; transformation of the sugars into lipides). These discoveries were the subject in 1957 of a work by Doctor Jean de Larebeyrette, entitled "Traite sur l'Hemogliase," and awarded a prize by the Academy of Medicine.

In certain pigs fed with conventional flours of the usual cereals, the presence has been confirmed of exudative myopathia, infarcts, acute oedema and haemogliase, which render meats inedible and unpreservable (see for example the Reports of 1955, 1956, 1957, 1958, 1959 of the Congres Internationaux de Nutrition Animale and the Congres sur l'Amelioration des Viandes, also the Congres des Instituts de Recherche sur les Viandes of 1959).

In poultry, the presence of histo-pathological disorders of the muscular tissue, anomalies of the protein structure of egg albumin and deterioration of their nutritive qualities have been observed, particularly.

The present invention consequently has the object of providing a process and apparatus for obtaining improved flours which are complete, readily attacked by yeast, capable of being cooked rapidly and capable of maintaining biological equilibrium in man so as to prevent the aggravation of metabolic illnesses.

According to one aspect of the invention, a process is provided for the preparation of cereal flours, which comprises subjecting cereal grains to softening in acidified aqueous solution in order to initiate enzymatic autolysis, and subjecting the thus-treated grains to simultaneous lacerating or fissuring with milling and vaporization, whereby enzymatic reactions are substantially arrested, 1–6 polysaccharide linkages are ruptured and the starch content of the grains undergoes a molecular stereochemical re-arrangement from a ramified into a straight chain form.

According to another aspect of the invention, an apparatus for preparing improved cereal flours comprises a thermostatically controlled column for subjecting cereal grains to enzymatic predigestion, and an assembly of corrugated distributing cylinders for subjecting the enzymatically predigested grains to simultaneous laceration or fissuring with milling or vaporization.

This invention also includes improved cereal flours made by the above-defined process of the invention or made in the above-defined apparatus of the invention.

The invention also contemplates the application of the above-defined process to the recovery of phosphorus-containing enzymo-vitamins from cereal brans and middlings.

Flours obtained in carrying out the invention remedy the afore-mentioned defects of conventional flours and also possess a number of additional advantages.

The process of the invention causes very considerable modifications in the streochemical arrangement of the molecular chains of the starch, which lose their ramified structure and become organized into linear chains.

(The rupture of the 1–6 polysaccharide links is particularly to be noted.) It also permits an increase and then the arrest of the enzymatic process, the stabilization of the lipides (absence of abnormal rancidity) and a modification of the proteins by way of autolysis, without however leading to the formation of amines.

The initiation of enzymatic autolysis, effected according to the invention in the phosphorus-containing enzymo-vitaminic, liquid phase, is important, notably because:

it effects the naturally activated onset of harmonious stages of autolysis; in relation to the enzyme substrate, according to the laws of Michaelis, under conditions of temperature, time, pH, $RH_2$, resistivity and oxygenations forming a group of coordinated criteria which, at any instant, may be adjusted to obtain maximum enzymatic activations;

it produces the fundamental biological conditions necessary (recognized by all biologists) for the digestibility of grains by higher animals, that is to say, the simultaneous presence in quantities strictly proportional to the starch content, of:

(a) The vitamin groups $B_1$–$B_2$–$B_6$–P.P. (pellagra preventing).

(b) The enzymes specific to each cereal ($\alpha,\beta$ amylase, 5 phosphatases).

(c) The phosphorylant substances (including orthophosphoric acid) which are absolutely necessary to the creation by the organism of its own co-enzymes (themselves specific and indispensable), the natural exhaustion of which must be compensated, in the course of assimilation, by an equivalent intake, which is precisely obtained by the process according to the invention.

Conventional flours have, in contrast, a mean deficit of 30 to 80% of vitamins, 50 to 60% of enzymes and contain only 350 mg. of phosphorus in place of 1450 mg./100 g. of whole grain.

These standard flours, even if subsequently enriched, have not been subjected to the proto-digestion which is itself necessary as a preliminary to the sufficient co-presence of enzyme-vitamins and phosphorylant substances, at the moment of the thermo-catalytic acid preparation.

The process according to the invention, in the catalytic phase uses not only the whole grain with its harmonious specific "vitamino-enzymo-phosphoric" equipment, but also a catalytic liquid enriched on the one hand with the same concentrated specific autolysate, derived from the same category of cereal as that which is being treated and, on the other hand, dilution to a pH suitable to the orthophosphoric acid, the second acid function of which ($pK_2$=6.82) is recognized as the only effective biological buffer (in the range of pH used, so far as in the invention by the natural process of metabolic intermediaries):

(a) To effect without destruction the natural and indispensable stages of oxydo-reduction, of cleavage and of reversible associations of all the carbon radicals;

(b) To form esters which participate in all the metabolic, lipidic, glucidic and proteinaceous processes necessary (both at the proto-digestion stage and at the stage of assimilation by man and animals) and, also precisely in the optimum range of temperatures and pH ranges, for the known enzymes of the grains and the enzymes of the living animals intended to assimilate them ultimately.

The flours obtained according to the process of the invention contain not only enzymes and vitamins, in harmonious equilibrium, but also glucidic ester linkages (in phosphoric form) in known optimum conditions (hexokinase, fructose-6-phosphate) for permitting the animal or man the correct formation of their glycogen.

This process in its diverse chemical phases creates, in addition, the conditions favourable for improvement of the malt-house technique and allows the utilization (by the concentrated enzymatic liquid) of brans and middlings (sharps) of conventional milling, which consequently become recoverable.

The flours according to the invention can be obtained from all cereals, for example, wheat, barley, maise, rice or rye and serve both as human foods (infant foods, biscuits, rusks, bread, etc.) and as animal foods. Moreover, they are complete in the sense that they comprise all parts of the grain having a nutritional value; they retain their vitamins are stable and preservable and their digestibility is more than 40% greater than that of conventional flours.

In order that the invention may be fully understood, the following description is provided with reference to the accompanying drawings, in which:

FIG. 1 shows diagrammatically and by way of example only one preferred embodiment of an apparatus for carrying out the process of the invention;

FIG. 1a shows diagrammatically the use of a supplementary pilot unit for the preparation of the specific concentrated autolysate employed for the protodigestion of the cereal;

FIG. 2 shows the X-ray diffraction spectrum of starch grains of a wheat flour obtained by standard processes;

FIG. 3 shows the X-ray diffraction spectrum of starch grains from a flour of the same lot of wheat obtained by the process according to the invention.

In FIG. 1, a column 1 is shown, in which washing, dust-removal and thermal preparation of the grains takes place; a column 2 is thermostatically controlled and in this enzymatic predigestion takes place; a heating-milling assembly is shown at 3.

Operation of the apparatus of FIG. 1 is as follows:

The column 1 contains a shaft 5 provided with rotating blades 6 and two screens 7 (upper) and 8 (lower) used respectively for the separation of light and heavy impurities. A motor 37 serves to rotate the shaft 5. While the lower screen 8 is closed, the grains to be treated are led by a duct 4 into the column 1, after having previously been cleaned if intended for the manufacture of flours for human consumption.

At this moment, the treatment liquor, which consists essentially of water at a temperature of the order of 30° to 40° C., either slightly acidified or not, is introduced through the inlet valve 9 after the screen 7 has been opened; the valve 9 allows the chemical conditions and aeration to be controlled, and particularly the dosage of oxygen into the stirring bath; to obtain good action, this dose should be of the order of 2.6 cc./l. if it is desired to avoid stopping the metabolism of the grains because of lack of oxygen.

After having been stirred for about an hour, the bath is allowed to stand for 5 to 10 minutes. The light impurities pan through the upper screen 7. This screen is closed and the impurities which are lighter than the grains are evacuated by the upper valve 9. The rotating blades 6 are set in motion for a period, while the screen 8 remains closed; the screen 8 is then opened, which allows the heavier waste to fall to the bottom of the column 1 and to be evacuated via the lower valve 10 provided for this purpose. At this moment, the screen 8 is withdrawn completely and the valve 11 is opened and allows the humid grains to pass into the predigestion column 2.

The treatment conditions for the grain in the column 1 are not to be interpreted as being limited to those given above by way of example. Thus, the temperature should be within the range of about 15°–65° C., the pH should be between 6.2 and 6.5, the concentration of oxygen in the liquor between 2.6 and 6.0 cc./l., and the stirring time should be between 1 and 5 hours. These different factors act simultaneously on the cereal during treatment, and modification of any one of them necessarily causes corresponding variation in at least one of the others.

The optimal yield of the operation is attained when the critical combination of these factors produces a medium in which the reaction proceeds constantly according to Michaelis' laws. When flours for animals consumption are being prepared, this first phase of the process which takes place in the column 1 can be dispensed with and the following pre-digestion phase can be taken immediately.

This column 2 is a container thermostatically-controlled by circulation of water or steam between its walls 12. Like the column 1, it includes a system of stirrer blades 13 mounted around a central shaft 14. A motor 15 serves to rotate the shaft 14.

At the upper part of the column 2, two ducts 16 and 17 are provided, for introducing respectively, the specific catalytic water of the desired pH resistivity and ($RH_2$) oxydo-reduction power and air which is oxygenated to a greater or lesser extent. The catalytic water is obtained by dilution in an acid medium of appropriate constitution of a concentrated autolysate, specific to the cereal being treated and prepared separately. This solution thus contains the natural dextrinantic, saccharific, gelatinolytic and proteolytic activities of the cereal. In the column 2, the proportion of oxygen always remains substantially constant in the region of 2.6 cc./l.; the water introduced through the duct 16 in the example described is buffered at a pH of 4.6, its resistivity is 130Ω x cm., and its oxydo-reduction power ($RH_2$) is 350; the temperature is approximately 30° C. The acidity of the aqueous medium is preferably obtained by orthophosphoric acid. Two probes 18 and 19 introduced through the lateral walls 12 of the column 2 permit continuous control of the oxygen content, on the one hand, and three quantities, pH, resistivity and $RH_2$, of the water, on the other.

Under these conditions, the contents are stirred for a period of time which may vary between one and four hours and which is a function, for any given cereal, of the field of application of the flour which is being prepared; the time for which stirring continues effectively must be such that the enzymatic autolysis proceeds to the isoelectric point of the proteins of the cereal considered.

In this column 2, as in the column 1, the conditions in the medium are controlled with respect to Michaelis' laws. In particular, the temperature can vary from 20° to 60° C., the treatment time from 1 to 10 hours, the oxygen concentration from 2 to 6 cc./l., the pH of the solution from 4.2 to 6.8, the resistivity of the catalytic water from 115 to 180Ω x cm., and the $RH_2$ from 250 to 450.

Endo-reactions progressively increase the pH of the solution and, at the end of stirring, re-establish the pH at preferably about 5.6, namely, during a period varying from 1 to 4 hours, until appearance of appreciable quantities of $\alpha$ and $\beta$ amlyases, which is established by sampling a portion of the liquid. This re-establishment of the pH at 5.6 is effected, in carrying out the invention, by the addition of water containing orthophosphoric acid or monophosphoric or polyphosphoric acid and even occasionally of phosphoric esters of organic origin. The pH value of 5.6 given by way of example is not limitative, the present feature is that the pH should be caused to fall to such a value and for such a time as to allow the appearance of appreciable quantities of $\alpha$ and $\beta$ amylases.

At the end of this operation, the grains have burst open, and pre-digestion is almost sufficient, they are then evacuated by way of a duct 20 to a draining reservoir 21 in which they pass over a vibrating perforated plate 22.

At the lower part of the column 2, a duct 23 is provided for drainage purposes and for distributing to three different receptacles 25, 26 and 27, by means of a three-way stop-cock 24, the liquid stirrage products respectively of pH 4.6, pH 5.6 and that at the end of the operation. A conduit 38 connects the drainage reservoir 21 to the receptacle 27, thus allowing collection of the drainage water.

After passing over the vibrating perforated plate 22, the grains pass into a hopper 28 above corrugated distributing cylinders 29 of known type. These cylinders distribute the grains on to milling cylinders 30, which furthermore are heated to a suitable temperature (about 150° C., by steam circulation, for example) and of which the separation is adjusted to a value, according to the cereal treated and to the temeprature, of from ⅒ to ⅟₃₀ mm.

At this moment, the principal operation of the treatment of the grains occurs, which are simultaneously and almost instantaneously burst open and dried; this virtually complete drying (only about 4% of water remains after the operation) causes instantaneous arrest of the enzymatic pre-digestion and induces in the starch a modification of its stereochemical structure, which was previously ramified and now becomes organized into linear chains; it is also important to note that the instantaneous arrest of the enzymatic pre-digestion at this treatment stage has virtually no destructive effect on the enzymes nor on the vitamins, which can consequently be reutilized subsequently either at the time of consumption or at the time when they are indispensable for the industrial conditioning of flours (for use in bread-making, biscuits or rusks). The simultnaeous action of the temperature, compression and vaporization on the pre-digested grains thus leads, according to the invention, to the modification of the stereochemical structures of the ramified starch chains, whereas no process of preparation, treatment or cooking known hitherto has permitted this result to be obtained.

Finally, the fine pellicule constituted by the milled grains is removed by various scrapers 31 and falls into a recovery chamber 32 and subsequently passes through a drying zone 33 fed with warm, dry air via a duct 34. The product is then discharged to 26 and treated by blade or hammer pulverizers (not shown) which ensure pulverization of the pellicule obtained.

In one embodiment of the process of the invention and which is particularly advantageous as regards the yield, the specific concentrated autolysate used in the pre-digestion column 2 is prepared, in a unitary auxiliary pilot, from part of the liquor recovered from this column 2, and in part, from the brans and middlings of this cereal.

This embodiment is now described with reference to FIGURE 1a. The washing and cleaning column 1a corresponds to the column 1 of FIG. 1 and is provided with a duct 4a for the entry of grains, a duct 9a for the entry of water, and an evacuation duct 10a; the duct 11a allows the passage of grains into column 2a identically with that shown in FIGURE 1. This column 2a is fitted in its turn with a duct 20a identical with duct 20 of FIGURE 1, intended to carry the grains to be treated towards the heating-milling assembly (not shown), and with a duct 23a for the evacuation of the treatment liquor.

A three-way tap 24a allows the treatment liquor to be distributed according to its pH towards three vessels 25a, 26a and 27a; a unitary pilot for the production of the specific concentrated autolysate is shown at 2b, and consists essentially of a treatment column identical with the column 2a. This column 2b receives:

(a) By the intermediary of the three-way tap 40 and of the duct 41, the liquor recovered from the column 2a, which is introduced via the conduit 16b into the column 2b;

(b) At 17b, the oxygen necessary for carrying on of the chemical proto-digestion reactions in column 2b;

(c) Via duct 39, the cereal wastes provided by the classical milling operations, namely the germ, bran, and pericarp, which contain the major part of the enzymo-vitaminic groups of the grains.

In this column 2b the same reaction takes place as in column 2a, but continues as far as the exhaustion of the ferments, since the cereal wastes do not enter the circuit of obtaining the flours according to the invention.

There thus results an enzymo-vitamino-phorphorylant concentrate, of the same specific nature as that of the column 2a, and which is introduced therein by the channel 16a. It thus serves to prime, the entry and activation of the reactions which take place in column 2a. The wastes resulting from the preparation of this concentrate are evacuated from the column 2 by the channel 42.

In particular the device of FIGURE 1a is able to be of great service to any techniques of malting cereals, since the enzymatic increase in the cereal is effected in a time of about 18 to 24 hours in place of the 8 to 15 days necessary in known malting. Furthermore, since the process of the invention takes place at low temperature, a complete recovery of the α and β amylases is possible, and also of the five phosphatases and of the other complementary and indispensable enzymatic systems; in particular, the after-heating of the concentrate on column 2b economically replaces the turning operation of the traditional maltery. It is thus that the device of FIGURE 1a allows the fabrication for each cereal of a concentrate which can be drawn along the channel 16c, and which contains its specific enzymatic groups provided with their fundamental activators.

The use of this concentrate, in particular, permits improvement in processes for the manufacture of beer. The enzymatic groups thus obtained may be readily preserved in an atmosphere of nitrogen, since the product contains only its specific quantity of water of hydration.

Morever the addition of two classical flours of a small quantity (0.5–5%) of the concentrate thus obtained, if introduced into the dough before its fermentation in the bakery, allows the baker to overcome in some measure the serious pathological inconveniences resulting from the nutritional defects of the classical flours.

In all parts of the apparatus of FIG. 1 or 1a which are in direct contact with the grains to be treated, the internal surfaces are covered with a ceramic or plastic material in order to prevent amino acids from being transformed into amines or picking up metallic ions, for which they have a great affinity.

The treatment process described above is of the discontinuous type for convenience of description; however, in practice, an apparatus is preferably used such that the cereals treated progress in a continuous manner from one end to the other of the chain.

Comparison of the spectra of FIGS. 2 and 3 illustrates the modification of the stereochemical structure of the starch grains after treatment by the process of the invention. In fact, the diffraction spectrum 35 of FIG. 2 clearly shows the six ramification chains of the starch of ordinary flours, the 1–6 link of which is precisely one of the chief causes of the metabolic accidents previously described.

By contrast, the diffraction spectrum 36 of FIG. 3, obtained with a wheat flour treated by the process of the invention, clearly shows a linear structure radically different from that of FIG. 2. The amylogram of this same flour shows an increase of 30% of amylase-activity which first appears at 45° C. instead of 50° C., which favours utilization in particular in feeding children as also in feeding livestock; the pre-digestion after cooking is increased by 700%.

The comparative table below gives, in column A the composition of a conventional flour and, in column B by way of non-limitative example, the composition of a flour obtained according to the process of the invention from the same wheat of current characteristics. In this table, the weights are given in milligrams per 100 grams.

|  | A | B |
|---|---|---|
| Vitamins: |  |  |
| Thiamin (vitamin B₁) | 0.70 | 3.50. |
| Riboflavin (vitamin B₂) | 1.0 | 1.25. |
| Nicotinic acid | 8 | 45. |
| Pantothenic acid | 4 | 13. |
| Enzymes: |  |  |
| Acid hydrolysis amylase activity | 1 | Activity increased by 350–500%. |
| Proportion of straight chains | 1% | Increased by 400–500%. |
| Glucose levulose | | Content doubled. |
| Lipides: |  |  |
| Glycerides | | Increased by 15%. |
| Unsaturated lipides (iodine numbers) | | Increased by 13–20%. |
| Rancidity rate | | 4 to 10 times less. |
| Phospholipides | 3.0 | 4.0–6.0. |
| Sulphur amino-acids without amines | 3.5 | 18.0–19.8. |

What I claim is:

1. A process for the preparation of cereal flours which comprises the steps of soaking cereal grains for from one to ten hours in an acidified aqueous solution containing from two cc./l. to six cc./l. of oxygen and having a pH between 4.2 and 6.8 and having a resistivity of from 115 to 180Ω x cm. and an oxydo-reduction power of from 250 to 450 and at a temperature in the range of 20° C. to 60° C. until enzymatic autolysis up to the isoelectric point of the cereal proteins is obtained and then simultaneously milling and dehydrating the grains whereby the enzymatic autolysis is stopped, 1–6 polysaccharide molecular linkages of the starch of the cereal grains are ruptured and the molecular stereochemical structure of the starch of the grains is rearranged from a ramified to a straight chain form.

2. A process according to claim 1, in which the grains are washed and subjected to dust-removal prior to the softening step.

3. A process according to claim 1, in which the aqueous medium is acidified to pH 4.6 with orthophosphoric acid.

4. A process according to claim 1, in which the autolysis is activated by means of an enzyme concentrate extracted from cereal of the same species as the cereal treated.

5. A process according to claim 4, in which the material is subjected to the autolysis process after being activated by stirring the grains at a pH adjusted to 5.6 by the addition of phosphoric acids of organic origin.

References Cited by the Examiner

UNITED STATES PATENTS

| 558,393 | 4/96 | Kellogg | 99—80 |
| 2,144,911 | 1/39 | Cohn. | |
| 2,571,555 | 10/51 | Fernandes | 99—237 |
| 2,584,893 | 2/52 | Lloyd et al. | 99—93 |
| 2,704,257 | 3/55 | De Sollano et al. | 99—93 |
| 2,854,339 | 9/58 | De Sollano et al. | 99—80 |
| 2,930,699 | 3/60 | De Sollano et al. | 99—80 X |

A. LOUIS MONACELL, *Primary Examiner.*

ABRAHAM H. WINKELSTEIN, *Examiner.*